United States Patent
Yantek et al.

(10) Patent No.: US 6,322,133 B1
(45) Date of Patent: Nov. 27, 2001

(54) FALLING OBJECT PROTECTIVE APPARATUS FOR AN INDUSTRIAL VEHICLE

(75) Inventors: David S. Yantek; Terrence M. Toohig; Kent D. Meyers, all of Chambersburg, PA (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/439,166

(22) Filed: Nov. 12, 1999

(51) Int. Cl.[7] .......................... B62D 25/06; B60R 21/02; B60R 21/13

(52) U.S. Cl. ................... 296/190.03; 296/102; 280/256

(58) Field of Search .................. 296/190.03, 102; 280/756

(56) References Cited

U.S. PATENT DOCUMENTS

| | | | |
|---|---|---|---|
| Re. 33,312 | * 8/1990 | Elliot | 172/554 |
| 2,027,163 | * 1/1936 | Graebner | 296/210 |
| 2,090,459 | * 8/1937 | Paton | 296/191 |
| 2,805,887 | * 9/1957 | Selby | 296/102 |
| 2,911,232 | 11/1959 | Hastings, Jr. et al. | 280/756 |
| 3,188,111 | * 6/1965 | Ells et al. | 296/102 |
| 3,289,871 | * 12/1966 | Tourneau et al. | 296/102 |
| 3,336,074 | * 8/1967 | Barner et al. | 296/102 |
| 3,455,599 | * 7/1969 | Becker | 296/102 |
| 3,561,785 | * 2/1971 | Kidder | 296/102 |
| 3,578,377 | * 5/1971 | Babbitt, Jr. et al. | 296/102 |
| 3,635,519 | * 1/1972 | Foster et al. | 296/137 R |
| 3,704,030 | * 11/1972 | McFerron | 296/102 |
| 3,712,664 | * 1/1973 | May | 296/102 |
| 3,953,067 | * 4/1976 | Isola | 296/137 A |
| 3,964,782 | * 6/1976 | Pernicka et al. | 296/102 |
| 3,966,526 | * 6/1976 | Doerfling | 156/224 |
| 4,023,827 | * 5/1977 | Matalonis et al. | 280/756 |
| 4,045,076 | * 8/1977 | Day, Sr. et al. | 296/39.3 |
| 4,055,262 | 10/1977 | Bauer et al. | 414/697 |
| 4,060,261 | * 11/1977 | Bauer et al. | 296/102 |
| 4,065,167 | 12/1977 | Wright | 296/190.03 |
| 4,079,985 | 3/1978 | Martin | 296/190.03 |
| 4,095,839 | 6/1978 | Lawrence et al. | 296/190.03 |
| 4,120,375 | 10/1978 | Shinoda et al. | 180/89.14 |
| 4,150,186 | * 4/1979 | Kazama | 428/140 |
| 4,202,565 | 5/1980 | Mosch | 280/756 |
| 4,205,874 | * 6/1980 | Martin | 296/102 |
| 4,405,280 | 9/1983 | Cochran et al. | 414/685 |
| 4,411,464 | * 10/1983 | Bauer | 296/102 |
| 4,919,233 | 4/1990 | Larsen et al. | 187/227 |
| 5,064,242 | * 11/1991 | Fujan et al. | 296/190 |
| 5,071,187 | 12/1991 | Smith et al. | 276/102 |
| 5,273,340 | * 12/1993 | Nelson et al. | 296/190 |
| 5,392,864 | * 2/1995 | Lindenmuth | 172/811 |
| 5,501,297 | 3/1996 | Josephs | 187/222 |
| 5,775,438 | * 7/1998 | Confoey et al. | 172/831 |

* cited by examiner

*Primary Examiner*—Stephen T. Gordon
*Assistant Examiner*—Hilary Gutman
(74) *Attorney, Agent, or Firm*—Michael Best & Friedrich LLP

(57) ABSTRACT

A protective apparatus for use in an industrial vehicle having an operator station including a protective member adapted to be connected with the vehicle so as to be generally disposed above the operator station. The protective member has a plurality of apertures configured to allow sound waves from vibrations of the vehicle to propagate through the protective member while generally preventing solid objects from falling through the protective member.

15 Claims, 2 Drawing Sheets

FALLING OBJECT PROTECTIVE APPARATUS FOR AN INDUSTRIAL VEHICLE

BACKGROUND OF THE INVENTION

The present invention is generally concerned with apparatus for protecting an operator of an industrial vehicle, and more particularly with falling object protective structures for vehicles such as compacting vehicles.

It is known in the art of industrial vehicles to provide a structure or apparatus for protecting the operators of such vehicles from injuries caused by falling objects and/or from the vehicle "rolling over". Examples of industrial vehicles including protection apparatus may be found in U.S. Pat. No. 2,911,232 of Hastings, Jr. et al., concerning an overhead guard for an industrial lift truck; U.S. Pat. No. 4,055,262 of Bauer et al., concerning a loader main frame for a skid steer loader; U.S. Pat. No. 4,065,167 of Wright, concerning a safety enclosure for a mining machine; and U.S. Pat. No. 4,095,839 of Lawrence et al., concerning a protective structure for a hydraulic excavator.

Certain industrial equipment include a "Roll Over Protective Structure" ("ROPS") device. Such devices generally consist of a structural framework capable of protecting a vehicle operator in the event that the vehicle "roll-overs", preferably in accordance with criteria established by the Society of Automotive Engineers (SAE) (i.e., ROPS protection). Further, some industrial vehicles include a ROPS device in combination with structural framework covered by a protective member to provide protection from falling objects. These devices are commonly referred to as Falling Object Protective Structures ("FOPS") and have to meet other stringent SAE criteria in order for the vehicle to be FOPS certified. Such FOPS or ROPS devices are generally provided on compacting vehicles or "compactors", as depicted for example, in U.S. Pat. No. 5,719,338 of Magalski et al.

One problem that occurs when operating many types of industrial vehicles is that noise is generated within the operator station of the vehicle, which may arise from such sources as the engines and/or motors that power movement of the vehicle or from other movable components (e.g., pumps) that function on the vehicle. For many types of vehicles, panels or layers of acoustic foam, generally of a thickness of several inches, have been used for deaden such sound to acceptable levels. However, certain industrial vehicles, such as compactors having roller drums which include vibrating mechanisms, generate low frequency noise. To attempt to deaden low frequency noise with acoustic foam would require a foam thickness measured in feet rather than inches. Thus, acoustic foam is not useful for reducing low frequency noise radiation and reflection arising within these types of industrial vehicles.

SUMMARY AND OBJECTS OF THE INVENTION

Accordingly, an object of the invention is to provide an improved falling object protective apparatus for use in an industrial vehicle.

Another object is to provide falling object protective apparatus including structure for reducing noise radiation therefrom in an industrial vehicle.

Yet another object is to provide falling object protection apparatus including structure for reducing noise reflection therefrom in an industrial vehicle.

An even further object of the present invention is to reduce reflected and radiated noise from a protective device containing an overhead member which, while not being capable of obtaining FOPS certification, is ROPS certified or even incapable of achieving either ROPS certification.

Other objects, features and advantages of the invention will become apparent to persons skilled in the art in the light of the following descriptions thereof.

The present invention modifies an industrial vehicle protective device by providing a protective member having a plurality of apertures to reduce the amount of reflected and radiated noise that reaches the machine operator. While the present invention is preferably directed to the improvement to a FOPS device in order to reduce reflected and radiated noise without losing FOPS certification, it is also within the scope of the present invention to provide a protective member that reduces reflected and radiated noise in an operator station that does not meet FOPS certification, such as with a device that is only a certified ROPS device or with any other type of industrial vehicle protective device.

According to the present invention, there is provided a protective apparatus for use in an industrial vehicle having an operator station. The apparatus comprises a protective member connectable with the vehicle so as to be generally disposed above the operator station. The protective member has a plurality of apertures configured to allow sound waves from vibrations of the vehicle to propagate through the protective member while generally preventing solid objects from falling through the protective member. The protective member is configured with at least enough apertures for reducing noise reflection and radiation therefrom so as to render the protective member substantially acoustically transparent.

In a preferred embodiment of the present invention, the protective member is configured such that a vehicle having the protective member meets and/or exceeds the SAE criteria for FOPS certification as discussed above. Preferably, each of the apertures is substantially cylindrically-shaped. Further, each of the apertures preferably has substantially the same inner diameter as any other aperture and the inner diameter of each of the apertures is within the range of from about 1.8 millimeters to about 25.4 millimeters.

Also, in accordance with the present invention, the Transparency Index (TI) of the protective member is high enough to render the protective member substantially acoustically transparent while maintaining FOPS certification. When using cylindrical apertures, the transparency index (TI) of the protective member may be calculated by the following formula:

$$TI = \frac{0.04 * (\% \text{ OPEN AREA})}{\pi t a^2}$$

where
- open area=the total sum of the areas of the apertures through the protective member;
- t=thickness of the protective member; and
- a=center-to-center between the apertures minus hole diameter.

According to a preferred embodiment of the invention, each of the apertures is arranged in a row of apertures and each of the apertures within the row is spaced a first predetermined distance from an adjacent aperture in the row. The first predetermined distance is preferably within the range of from substantially 6.0 to 38.2 millimeters. Further, the apertures are also preferably arranged in an array including a plurality of rows of apertures, with each of the rows of apertures being spaced a second predetermined distance from an adjacent row thereof. The second predetermined distance is preferably within the range of about 3.0 millimeters to about 19.1 millimeters.

Preferably, a vehicle having the protective device connected thereto is capable of obtaining both ROPS and FOPS certification in accordance with the SAE criteria.

BRIEF DESCRIPTION OF THE DRAWINGS

Selected parts of the drawings hereinafter described may be shown out of scale for the sake of illustrative clarity. Moreover, cross-sectional views, if any, that are included herein may be focused on and limited to a view along the line of the cross-section, and may omit background structure that would otherwise be shown in a true cross-sectional view, again, for the sake of illustrative clarity. As shown in the following drawings wherein like reference numerals may designate like or corresponding parts throughout the several Figures.

DETAILED DESCRIPTION OF THE INVENTION

Figure 1:
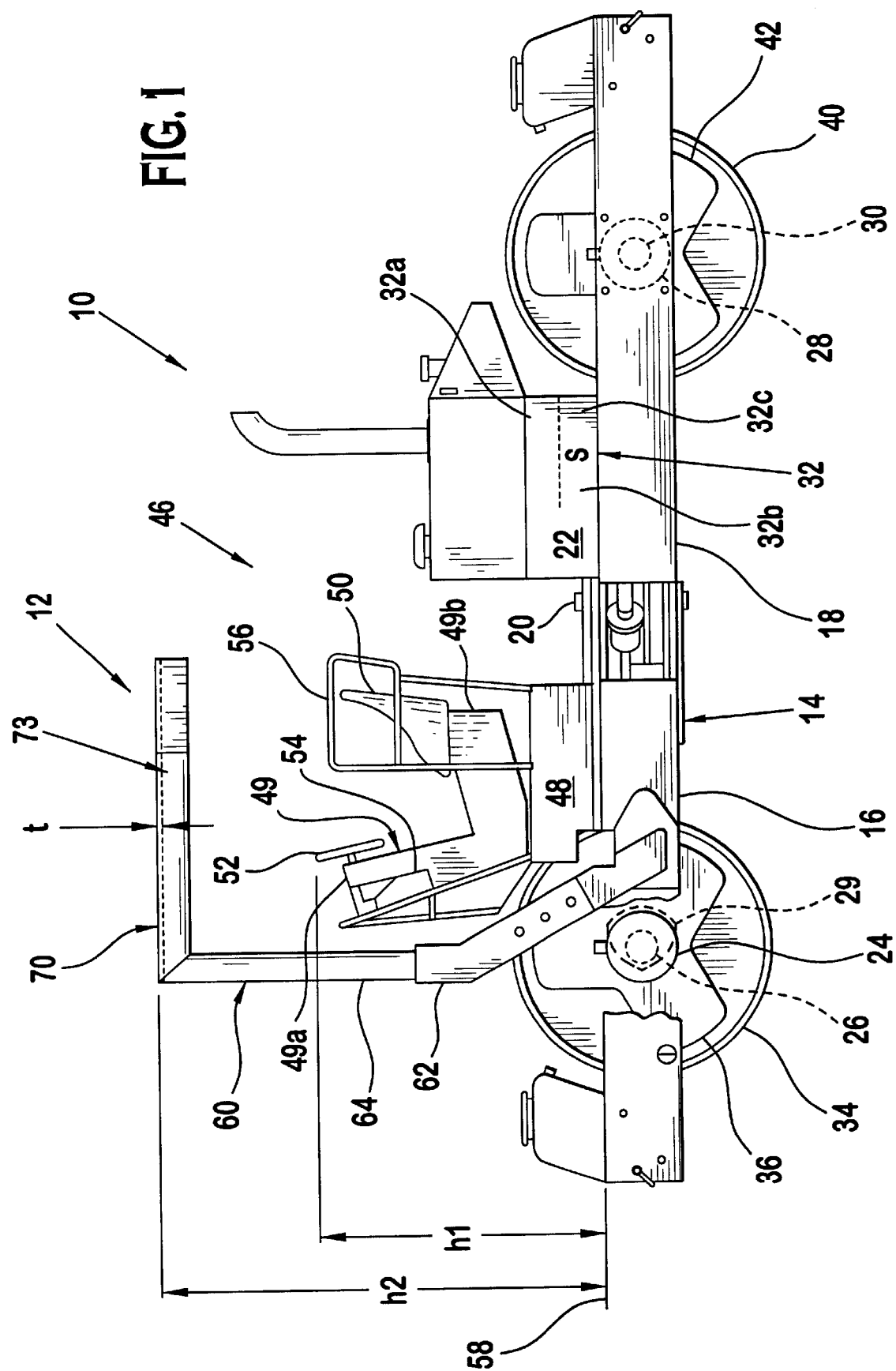
FIG. 1 is a schematic, side elevation, view of a prior art vibratory compacting vehicle including falling object protection apparatus.
Figure 2:
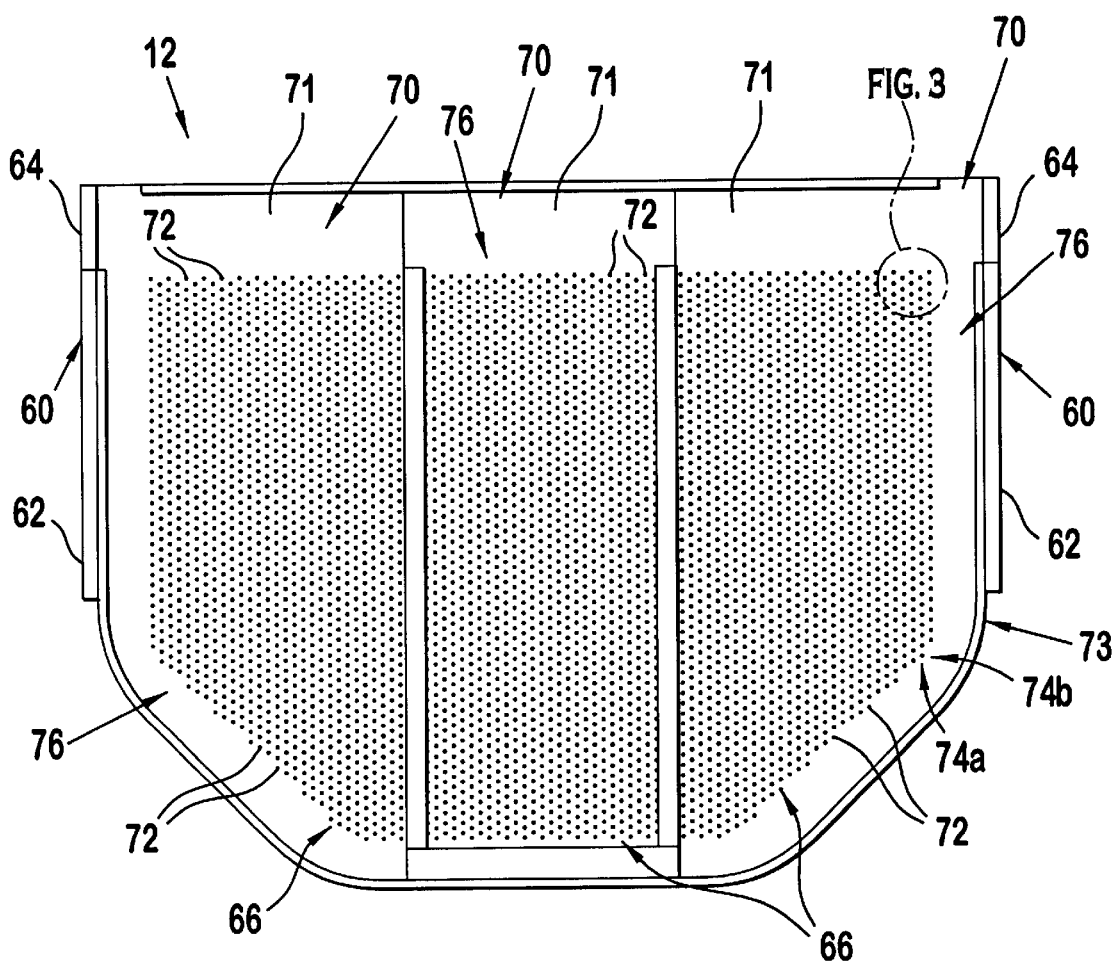
FIG. 2 is an enlarged top plan view of FIG. 1, showing the falling object protection apparatus of FIG. 1 modified according to the invention.
Figure 3:
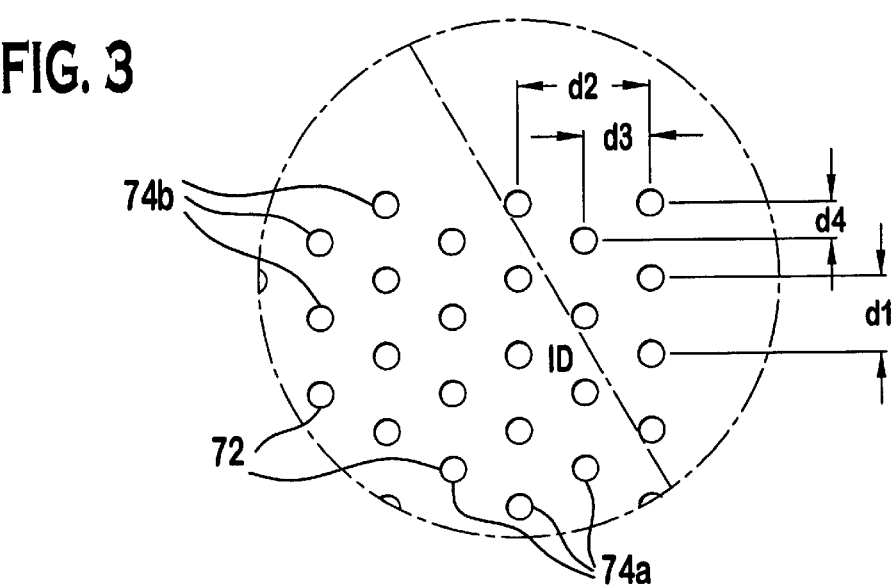
FIG. 3 is an enlarged view of an arbitrarily chosen circularly-shaped portion of the view of FIG. 2, showing respective dimensions of the falling object protection apparatus of FIG. 2.

Referring now to the drawings in detail, there is shown in FIGS. 1–3 a protective apparatus 12, for an industrial vehicle 10 having an operator station 46, in accordance with the present invention. The protective apparatus 12 generally comprises a protective member 70 connectable with the vehicle 10 so as to be generally disposed above the operator station 46. The protective member 70 has a plurality of apertures 72 configured to allow or permit sound waves generated by vibrations of the vehicle 10 to propagate through the protective member 70, while generally preventing solid objects from falling through the protective member 70. Further, the protective member 70 is configured for reducing noise reflection and radiation from the protective member 70, such that the member 70 is substantially acoustically transparent.

The protective member 70 is shaped and dimensioned to generally protect an operator (not shown) disposed within the operator station 46 from falling objects (not shown) and to prevent operator injury due to rollover of the vehicle 10. Preferably, the protective member 70 is configured as a generally flat panel 71 disposable within a frame 73 mounted on the vehicle 10 and extending above the operator station 46. Each of the above-discussed elements of the protective apparatus 12 of the present invention is described in further detail below.

Referring particularly to FIG. 1, the protective apparatus 12 of the present invention is preferably used with a compacting vehicle or compactor, and most preferably a vibratory compacter 10. However, the protective apparatus 12 may be used with any other type of industrial vehicle 10, such as for example, a paving vehicle, a front-end loader, a forklift vehicle or any other type of vehicle that would benefit from the protective apparatus 12 (none shown).

Still referring to FIG. 1, such a compacting vehicle 10 generally includes an elongate chassis 14, having a front-end portion that is generally identified by the numeral 16. The chassis 14 also has a rear end portion that is generally identified by the numeral 18. The vehicle 10 includes a suitable a diesel engine 22 mounted on the rear end portion 18 of the chassis 14. A hydraulic motor 24 is conventionally mounted to the front end portion 16 of the chassis 14 and has an output drive shaft 26. Further, another hydraulic motor 28 is conventionally mounted to the rear end portion 18 of the chassis 14 and has an output drive shaft 30. Furthermore, the vehicle 10 includes conventional hydraulic structures 32 extending between the diesel engine 22 and the front and rear hydraulic motors, 24 and 28, for driving the motors, 24 and 28, in response to input from an operator (not shown).

The compacting vehicle 10 also generally includes a front, ground-contacting roller drum 34, having a front drive plate 36 that is conventionally connected to the output drive shaft 26 of the front hydraulic motor 24 for supporting the front-end portion 16 of the chassis 14. The front hydraulic motor 24 is conventionally connected to the front roller drum 34 for rotatably driving the front roller drum 34. Further, a rear, ground-contacting, roller drum 40 having a rear drive plate 42 conventionally connected to the output drive shaft 30 of the rear hydraulic motor 28 for supporting the rear end portion 18 of the chassis 14. The rear hydraulic motor 28 is conventionally connected to the rear roller drum 40 for rotatably driving the rear roller drum 40.

Further, a conventional vibratory mechanism 29 is mounted within each roller drum 34 and 40. As is known, such vibratory mechanisms 29 typically include one or more weights eccentrically mounted on shaft (not shown) such that, when the shaft rotates, the eccentrically mounted weights produce oscillatory vibrations in the respective drum 34 or 40. These oscillatory vibrations, while increasing compacting ability of the drums 34, 40, generate low frequency noise within the operator station 46, as discussed above.

Still referring to FIG. 1, the compacting vehicle 10 additionally includes a conventional operator station 46 located generally above the front-end portion 16 of the chassis 14. The operator station 46 includes a pedestal 48 that is conventionally mounted on the front end 16 of the chassis 14. Preferably, an L-shaped platform 49 is suitably swivelably mounted on the pedestal 48. The platform 49 has an upwardly extending front portion 49a and a rearwardly extending base portion 49b. Further, a seat 50 for the operator (not shown) is suitably mounted on the base portion 49b of the platform 49. The operator station 46 further includes an operator console 54 attached to the front portion 49a of the platform 49 and having appropriate manually operable controls (not shown) for electrically controlling the front and rear hydraulic motors 24, 28, respectively. The operator station 46 is generally located at an arbitrarily selected, convenient, height "h1" above a given level 58 of the chassis 14.

Referring now to FIGS. 1 and 2, the compacting vehicle 10 preferably includes a pair of upright stanchions 60 that are laterally spaced apart from each other. Each of the stanchions 60 has a lower end portion 62 that is conventionally fixedly secured to the front end portion 16 (FIG. 1) of the chassis 14. In addition, each of the stanchions 60 (FIG. 2) has an upper end portion 64 that extends substantially vertically upwardly from the lower end portion 62 (FIG. 1), and above the given chassis level 58, to a selected height "h2" above the given level 58 of the chassis that is higher that the height h1 of the operator station 46. Further, the protective apparatus 12 is conventionally connected to the respective upper end portions 64 of the stanchions 60 so as to extend substantially horizontally therefrom, at the aforesaid height h2 and in overhanging relationship with respect to the operator console 54 and, in particular the seat 50 thereat to protect the operator (not shown) from falling objects (not shown).

Referring again to FIGS. 1–3, the protective apparatus 12 preferably includes a plurality of the protective members 70 (three depicted) configured as generally flat panels 71. Preferably, each panel 71 is generally rectangularly-shaped and has a generally constant thickness "t" (FIG. 1). The thickness "t" is preferably within the range of from about 3.0 millimeters to about 6.4 millimeters for the preferred embodiment device 12 used for a compacting vehicle 10 having FOPS certification. Further, the protective members 70 are each disposed within the frame 73 such that the panels 71 extend generally horizontally above the operator station 46 to provide a generally rectangular overhead protective "canopy".

Although it is preferred to construct the protective apparatus with a plurality of protective members 70 that are each configured as generally flat panels 71, it is within the scope of the present invention to construct the protective member(s) in any other appropriate configuration that enables the protective apparatus to function generally as described herein. For example, the protective apparatus 12 made be constructed of only a single protective member 70. Further for example, the protective members 70 may be constructed in configurations other than as a panel (e.g., blocks) and/or may be generally curved or have a varying thickness as opposed to being generally flat.

As yet another example, the panels 71 may be constructed so as to be circular, hexagonal or any other desired overall shape and/or may be connected directly to the vehicle 10 (e.g., bolted to stanchion upper ends 64), in which case the apparatus 12 would be constructed without the frame 73. The present invention encompasses the configurations discussed above and all appropriate constructions of the protective member(s) 70 that enable the protective apparatus 12 to generally function as described herein.

Referring particularly to FIGS. 2 and 3, each of the panels 71 includes a plurality of apertures 72 formed therein for reducing noise reflection and noise radiation from the protective apparatus 12. As discussed above, sound waves are generated within the operator station 46 as a result of the operation of various systems or components of the vehicle 10, such as the engine 22, hydraulic motors 24 and 28 and other moving mechanisms (e.g. hydraulic pumps). Further, the vibratory mechanisms (not shown) within the roller drums 34 and 40 generate low frequency sound waves or noise levels within the operator station 46 that are particularly undesirable.

By providing the apertures 72 through the protective member 70, sound waves incident upon the protective member 70 are able to pass or propagate through the member 70 rather than being reflected back into the operator station 46, which would otherwise increase the noise level within the station 46. Furthermore, as the protective member 70 itself vibrates due to vibration of moving components of the vehicle 10, as discussed above, the vibration of the member 70 may create sound waves that increase the noise level in the operator station 46. However, the apertures 72 in the member 70 reduce the amount of air movement caused by vibration of the protective member 70, such that noise in the form of sound waves generated by the vibrating member 70, and radiated therefrom, is also reduced. In other words, the apertures 72 cause the protective member(s) 70 to be substantially unable to push any meaningful volume of air when the member 70 vibrates.

In the preferred embodiment, the size and spacing of the plurality of apertures 72 is such that it maximizes the Transparency Index (TI) of the protective member(s) 70, which is a measure of the degree to which sound waves are able to propagate through the member 70, while still providing sufficient a structural integrity such that the vehicle 10 is capable of achieving FOPS certification. As discussed above, FOPS certification is performed in accordance with criteria established by the Society of Automotive Engineers, as contained, for example, in the SAE Recommended Practices manual.

With a preferred construction of the protective member 70 having substantially cylindrical apertures 72, the transparency index (TI) of the protective member 70 may be determined using the following formula:

$$TI = \frac{0.04 * (\% \text{ OPEN AREA})}{\pi t a^2}$$

where:
open area=the sum of the areas of the apertures through the protective member;
t=thickness of the protective member; and
a=center-to-center between the apertures minus hole diameter.

While the preferred protective member 70 is configured to enable the vehicle 10 to be FOPS certified, it is within the scope of the present invention to construct a protective member 70 for reducing noise levels within an operator station 46 even if the vehicle 10 does not meet FOPS certification. Typically, an industrial vehicle 10 not meeting FOPS certification is still desired to achieve at least ROPS certification (i.e., roll-over protection certification), such that an appropriately constructed protective member 70 may be used with a ROPS structure in such applications. Further, it is within the scope of the present invention to construct the member(s) 70 of the protective apparatus 12 with the apertures 72 in order to reduce noise in an operator station 46 in any industrial vehicle 10 that would benefit from reduced noise levels in its operator station 46, even if the vehicle 10 does not meet the requirements for FOPS and/or ROPS certification.

Still referring to FIGS. 2 and 3, as described above, the apertures 72 (FIG. 3) of each protective member 70 are configured for reducing noise reflection and noise radiation from the protective apparatus 12. Basically, the greater the number and size of the apertures 72 formed in the structure 70, the greater the acoustical transparency of the member 70, thus decreasing the sounds waves reflected and/or radiated from the member 70. As a competing consideration, however, the greater the ability of the member 70 to protect an operator (not shown) from falling objects (not shown), generally the lesser the capability of the protective apparatus 12 to propagate sound waves therethrough. Thus, the protective member 70 must be constructed such that the configuration and placement of the apertures 72 achieves both a satisfactory noise reduction and provides a desired degree of protection from falling objects.

There are numerous preferred embodiments of the protective member having apertures 72 (FIG. 3) that have been found to be effective for reducing noise reflection and radiation from the protective apparatus 12 that provides sufficient protection such that the vehicle 10 is capable of achieving FOPS certification. Preferably, each of the apertures 72 is substantially cylindrically-shaped and has substantially the same, generally constant inner diameter "ID", which is preferably within the range of from about 1.8 millimeters to about 25.4 millimeters.

Moreover, the apertures 72 are preferably arranged in a pattern of two horizontal, perpendicularly-extending rows 74a and 74b of apertures 72 (i.e., rows and columns). Further, each of the apertures 72 in a given row 74a is preferably spaced a predetermined distance "d1" from an adjacent aperture 72 in the same row 74a thereof. Preferably, each of the apertures 72 in a given row 74b is spaced a predetermined distance "d2" from an adjacent aperture 72 in the same row 74b thereof. Furthermore, each of the predetermined distances, d1 and d2, between any two adjacent apertures 72 in a given one of the rows, 74a and 74b, is preferably within the range of from about 6.0 millimeters to about 38.2 millimeters.

Further, the apertures 72 are preferably arranged in a substantially rectangularly-shaped array 76 (FIG. 2) of apertures 72 including a plurality of rows 74a thereof extending substantially parallel to one another and a plurality of rows 74b of apertures 72 extending substantially parallel to one another. Further, it has been found that each of the rows 74a of apertures 72 is preferably spaced a predetermined distance "d3" from an adjacent row 74a of apertures 72, and that the predetermined distance d3 is preferably within the range of from about 3.0 millimeters to about 19.1 millimeters. Moreover, the rows 74b of apertures 72 are preferably spaced a predetermined distance "d4" from an adjacent row 74b of apertures 72, the predetermined distance d4 being preferably within the range of from about 3.0 millimeters to about 19.1 millimeters.

While the apertures 72 are shown as being generally circular or cylindrical in shape, it is within the scope of the present invention to configure the apertures 72 in any desired shape, configuration, size and/or relative placement on the member 70. For example, the apertures 72 may have a cross-section or profile that is generally rectangular, hexagonal, ovular, complex-shaped or any other desired cross-section or profile (none shown) as desired or deemed appropriate. Further for example, the apertures 72 may be of any desired size, may be disposed in a grid of circles, staggered rows, randomly placed on the protective member 70, etc. Furthermore, the apertures 72 may have an inner diameter that falls outside of the desired ranges described above and/or may be spaced apart at greater or lesser distances than as discussed above. The present invention includes all configurations and arrangements of the apertures that generally enable the protective apparatus 10 to function generally as described in detail above.

Although the preferred embodiments of the invention have hereinabove been shown and described in detail, such embodiments should be considered to be illustrative and not restrictive in character. In this connection it is noted that numerous variations of the preferred embodiments of the invention may become apparent to persons skilled in the art as a result of having seen the foregoing drawings and read and understood the accompanying description appertaining to the invention, and it is intended that such variations as fall within the spirit and scope the invention shall be protected to the same extent as are the preferred embodiments of the invention.

We claim:

1. A protective apparatus for use in a compacting vehicle having an operator station, at least one roller drum and a vibratory mechanism mounted within the drum, the apparatus comprising:

a substantially rigid protective member connectable with the vehicle so as to be disposed generally above the operator station, the protective member having a plurality of apertures configured to allow sound waves from vibrations of the vehicle, including low frequency sound waves generated by operation of the vibratory mechanism, to propagate through the protective member while generally preventing solid objects from falling through the protective member, each of the plurality of apertures having an inner diameter within the range of from about 1.8 millimeters to about 25.4 millimeters.

2. The apparatus as recited in claim 1 wherein the protective member is configured for reducing noise reflection and radiation from the protective member.

3. The apparatus as recited in claim 1 wherein the protective member is configured as a generally flat panel.

4. The apparatus as recited in claim 1 further comprising a plurality of protective members.

5. The apparatus as recited in claim 1 wherein the apparatus further comprises a frame attachable to the vehicle so as to generally extend above the operator station, the protective member being disposed within the frame.

6. The apparatus as recited in claim 1 wherein each of the apertures is substantially cylindrically-shaped.

7. The apparatus as recited in claim 1 wherein each of the apertures has substantially the same inner diameter as any other aperture.

8. The apparatus as recited in claim 1 wherein the protective member is configured to have a transparency index such that the sound waves incident upon the member generally pass through the member without reflection.

9. The apparatus as recited in claim 8 herein the transparency index (TI) of the protective member is determined by the formula:

$$TI = \frac{0.04*(\%\ \text{OPEN AREA})}{\pi t a^2}$$

where:

open area=the sum of the areas of the apertures through the protective member, t=thickness of the protective member, and a=center-to-center distance between each of the plurality of apertures minus hole diameter.

10. The apparatus as recited in claim 1 wherein each of the apertures is arranged in a row of apertures.

11. The apparatus as recited in claim 10 wherein each of the apertures is spaced a first predetermined distance from each adjacent aperture in the row of apertures.

12. The apparatus as recited in claim 11 wherein the first predetermined distance is within the range of from about 6.0 millimeters to about 38.2 millimeters.

13. The apparatus as recited in claim 1 wherein the apertures are arranged in an array of apertures including a plurality of rows of apertures and each of the rows of apertures is spaced a second predetermined distance from an adjacent row of apertures.

14. The apparatus as recited in claim 13 wherein the second predetermined distance is within the range of from about 3.0 millimeters to about 19.1 millimeters.

15. A protective apparatus for use in an industrial vehicle having an operator station, the apparatus comprising:
- a protective member connectable with the vehicle so as to be disposed generally above the operator station, the protective member having a plurality of apertures configured to allow sound waves from vibrations of the vehicle to propagate through the protective member while generally preventing solid objects from falling through the protective member;
- wherein the protective member is configured to have a transparency index such that the sound waves incident upon the member generally pass through the member, the transparency index (TI) of the protective member being determined by the formula:

$$TI = \frac{0.04 * (\% \text{ OPEN AREA})}{\pi t a^2}$$

where:
open area=the sum of the areas of the apertures through the protective member,
t=thickness of the protective member, and
a=center-to-center distance between each of the plurality of apertures minus hole diameter,
the open area having a minimum value equal to 0.35%, the thickness having a minimum value of 3 millimeters and the minimum center-to-center distance between each of the plurality of apertures being 4.24 millimeters.

* * * * *